US008449261B2

(12) United States Patent
Kappis et al.

(10) Patent No.: US 8,449,261 B2
(45) Date of Patent: May 28, 2013

(54) BLADE FOR AN AXIAL COMPRESSOR AND MANUFACTURING METHOD THEREOF

(75) Inventors: Wolfgang Kappis, Fislisbach (CH); Luis Federico Puerta, Rieden (CH); Marco Micheli, Schoeffisdorf (CH)

(73) Assignee: Alstom Technology Ltd, Baden (CH)

( * ) Notice: Subject to any disclaimer, the term of this patent is extended or adjusted under 35 U.S.C. 154(b) by 658 days.

(21) Appl. No.: 12/756,729

(22) Filed: Apr. 8, 2010

(65) Prior Publication Data

US 2010/0260610 A1 Oct. 14, 2010

(30) Foreign Application Priority Data

Apr. 9, 2009 (EP) .................................... 09157726

(51) Int. Cl.
*B64C 27/46* (2006.01)

(52) U.S. Cl.
USPC .................. 416/223 R; 416/243; 416/223 A; 416/DIG. 2; 416/DIG. 5

(58) Field of Classification Search
USPC .................... 416/223 R, 243, 223 A, DIG. 2, 416/DIG. 5
See application file for complete search history.

(56) References Cited

U.S. PATENT DOCUMENTS

| | | | | |
|---|---|---|---|---|
| 6,299,412 | B1 | 10/2001 | Wood et al. | |
| 6,331,100 | B1 | 12/2001 | Liu et al. | |
| 6,478,537 | B2 | 11/2002 | Junkin | |
| 7,520,729 | B2 * | 4/2009 | McGowan et al. | 416/223 R |
| 7,530,793 | B2 * | 5/2009 | Huskins et al. | 416/223 R |
| 7,534,092 | B2 * | 5/2009 | Columbus et al. | 416/223 R |
| 7,537,434 | B2 * | 5/2009 | Cheruku et al. | 416/223 R |
| 7,766,624 | B2 * | 8/2010 | Arinci et al. | 416/223 R |
| 7,785,074 | B2 * | 8/2010 | Novori et al. | 416/223 R |
| 2001/0036401 | A1 | 11/2001 | Harvey et al. | |
| 2008/0263865 | A1 | 10/2008 | Daniels et al. | |

FOREIGN PATENT DOCUMENTS

| | | |
|---|---|---|
| EP | 1 106 835 A2 | 6/2001 |
| EP | 1 106 836 A2 | 6/2001 |
| EP | 1 118 747 A2 | 7/2001 |

OTHER PUBLICATIONS

European Search Report for EP 09157726.2 dated Dec. 28, 2009.
"Utility Advanced Turbine Systems (ATS) Technology Readiness Testing—Phase 3 Restructured (3R): Program Plan Including Technical Approach/Statement of Work and Project Schedule for Budget Period 4, DE-FC2-95MC31176-26", U.S. Department of Energy OSTI Energy, Mar. 17, 2009, pp. 1-49.

* cited by examiner

*Primary Examiner* — Igor Kershteyn
(74) *Attorney, Agent, or Firm* — Buchanan Ingersoll & Rooney PC

(57) ABSTRACT

The disclosure provides blades, and the modification thereof, for stages 18-22 of an axial compressor wherein the blades have reduced susceptibility to tip cracking. The blades and blades manufactured by the provided method have a thickened profile that results in reduced stress in response to multi frequency impulses and can have increased frequency response of the chord wise bending mode.

7 Claims, 4 Drawing Sheets

BLADE FOR AN AXIAL COMPRESSOR AND MANUFACTURING METHOD THEREOF

RELATED APPLICATIONS

This application claims priority under 35 U.S.C. §119 to European Patent Application No. 09157726.2 filed in Europe on Apr. 9, 2009, the entire content of which is hereby incorporated by reference in its entirety.

FIELD

The disclosure relates to axial compressor blades and design methods thereof. For example, the disclosure relates to blades without shrouds and design methods that provide or produce unshrouded blades in stages 18-22 of axial compressors resilient to tip corner cracking.

BACKGROUND INFORMATION

Detailed design simulation may not eliminate all axial compressor blade failures as some of these failures can be a result of interaction between different components and therefore difficult to predict. One such failure mode is tip corner cracking that occurs towards the trailing edge of a blade due to Chord-Wise bending mode excitation. It is understood that the failure may be a result of resonance of the vanes passing frequency, which is the frequency of the vanes' wakes impacting an adjacent blade, and the chord-wise bending, which relates to a particular blade's Eigen-frequency. This can be characterised by a local bending of the tip of the blade in a direction perpendicular to the blade's chord. Another assumed failure cause can be a forced excitation resulting from rubbing of the blade's tip against the compressor casing. This rubbing can occur wherever new blades are mounted in a compressor.

Known solutions to tip corner cracking can include increasing the number of vanes. While this can be effective in eliminating a particular resonance, the solution can increase manufacturing cost and reduces stage efficiency and further does not address the problem of rubbing.

Another solution can involve increasing the blade's clearances at the tip, thereby reducing the rubbing potential. This however can reduce stage efficiency and may negatively affect the surge limit.

A further solution can involve changing the blade design by introducing squealer tips or abrasive coating, for example as described in U.S. Pat. No. 6,478,537 B2 as it relates to turbine blades, and/or using a hardened material on the blade's tip, as described in U.S. Patent Application Publication No. 2008/0263865 A1.

In each case disclosed above, manufacturing costs can be increased. In addition, the foregoing solutions do not always address tip corner cracking.

SUMMARY

A blade for a multi-stage axial compressor, for use in any one of stages eighteen to twenty one of the axial compressor, including a base and an airfoil, extending radially from the base, having a suction face and a pressure face, a second end radially distal from the base, a chord length, a camber line, a thickness defined by a distance, perpendicular to the camber line, between the suction face and the pressure face, a plurality of relative thicknesses, defined as the thickness divided by the chord length, an airfoil height, defined as a distance between the base and the second end, and a relative height, defined as a height point, extending in the radial direction from the base, divided by the airfoil height, at a first division starting from the base, the relative airfoil height is 0.000000 and a maximum relative thickness at that height is 0.1200, at a second division starting from the base, the relative airfoil height is 0.305181 and a maximum relative thickness at that height is 0.1139,at a third division starting from the base, the relative airfoil height is 0.553382 and a maximum relative thickness at that height is 0.1089, at a fourth division starting from the base, the relative airfoil height is 0.745602 and a maximum relative thickness at that height is 0.1050, at a fifth division starting from the base, the relative airfoil height is 0.884467 and a maximum relative thickness at that height is 0.1023, at a sixth division starting from the base, the relative airfoil height is 0.973731 and a maximum relative thickness at that height is 0.1005, and at a seventh division starting from the base, the relative airfoil height is 1.0000 and a maximum relative thickness at that height is 0.1000, each maximum relative thickness has a tolerance of +/−0.3%, and is carried to four decimal places and each relative height is carried to six decimal places.

A stage twenty-two blade for a multi-stage axial compressor including a base, and an airfoil, extending radially from the base, having a suction face and a pressure face, a second end radially distal from the base, a chord length, a thickness defined by a distance between the suction face and the pressure face, a plurality of relative thicknesses defined as the thickness divided by the chord length, an airfoil height defined as a distance between the base and second end, and a relative height defined as a height point, extending in the radial direction from the base, divided by the airfoil height, at a first division starting from the base, the relative airfoil height is 0.000000 and a maximum relative thickness at that height is 0.1100, at a second division starting from the base, the relative airfoil height is 0.276215 and a maximum relative thickness at that height is 0.1027, at a third division starting from the base, the relative airfoil height is 0.503836 and a maximum relative thickness at that height is 0.0967, at a four division starting from the base, the relative airfoil height is 0.690537 and a maximum relative thickness at that height is 0.0920, at a fifth division starting from the base, the relative airfoil height is 0.835465 and a maximum relative thickness at that height is 0.0885, at a sixth division starting from the base, the relative airfoil height is 0.947997 and a maximum relative thickness at that height is 0.0860, and at a seventh division starting from the base, the relative airfoil height is 1.0000 and a maximum relative thickness at that height is 0.0850, each maximum relative thickness has a tolerance of +/−0.3%, and is carried to four decimal places and each relative height is carried to six decimal places.

A method for manufacturing a modified airfoil of a blade for a multistage axial compressor based on a pre-modified airfoil of a blade wherein the blade includes a base and an airfoil that has a pressure face, a suction face, and a thickness defined as the distance between the pressure face and the suction face. The method includes: a) checking, by simulation, a stress level of the pre-modified airfoil of a blade in response to a perfect impulse using force response analysis; b) thickening, by simulation, of the airfoil in a way that shifts a natural frequency of the pre-modified airfoil to a higher frequency and reduces a stress in the pre-modified airfoil in response to a multi frequency impulse; c) checking, by simulation, a stress level of the modified airfoil in response to a perfect impulse by force response analysis, and when the stress level is less than 50% of the stress level of a) repeat from b); and d) manufacturing a blade with the modified airfoil of b).

BRIEF DESCRIPTION OF THE DRAWINGS

Exemplary embodiments of the present disclosure are described more fully hereinafter with reference to the accompanying drawings, in which.

Figure 1:
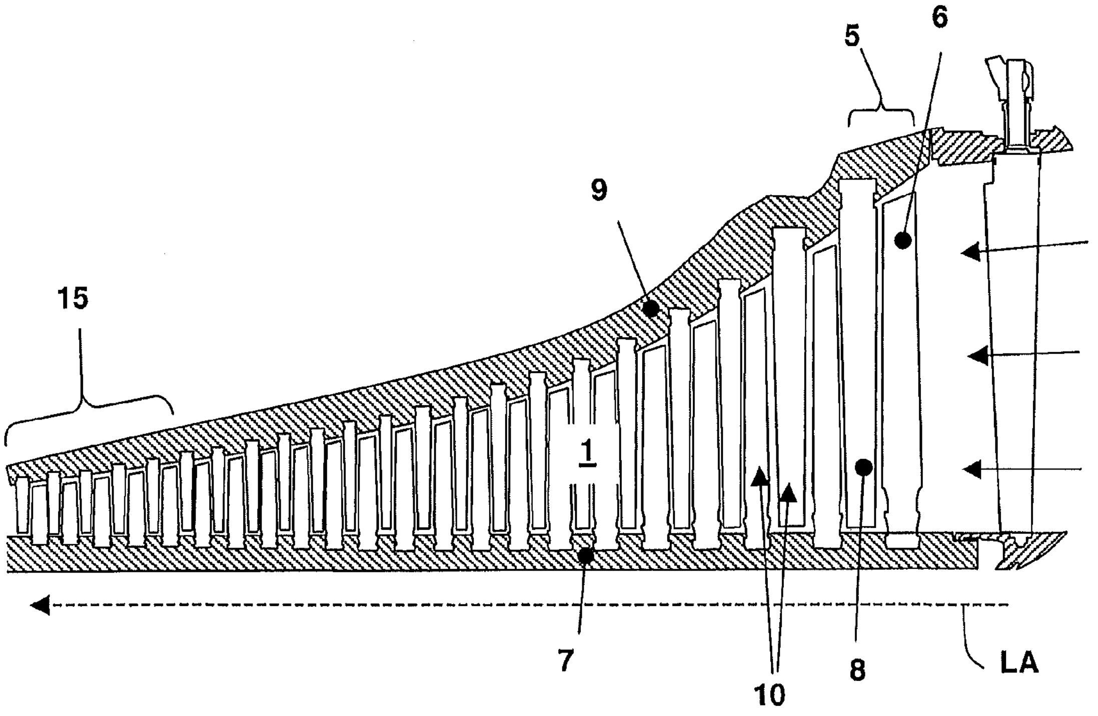
FIG. 1 is a cross sectional view along the longitudinal axis of a portion of an axial compressor section that includes exemplary blades.

In the drawings, wherein like reference numerals are used to refer to like elements throughout. In the following description, for purposes of explanation, numerous specific details are set forth in order to provide a thorough understanding of the disclosure. It may be evident, however, that the disclosure may be practiced without these specific details.

DETAILED DESCRIPTION

An exemplary embodiment provides a blade for a multi-stage axial compressor. The exemplary blade can include an airfoil, extending from a base, with a plurality of maximum relative thicknesses at a plurality of relative heights at a plurality of divisions. At a first division starting from the base, the relative airfoil height can be, for example, 0.000000 and the maximum relative thickness at that height can be, for example, 0.1200. At a second division starting from the base, the relative airfoil height can be, for example, 0.305181 and the maximum relative thickness at that height can be, for example, 0.1139. At a third division starting from the base, the relative airfoil height can be, for example, 0.553382 and the maximum relative thickness at that height can be, for example, 0.1089. At a fourth division starting from the base, the relative airfoil height can be, for example, 0.745602 and the maximum relative thickness at that height can be, for example, 0.1050. At a fifth division starting from the base, the relative airfoil height can be, for example, 0.884467 and the maximum relative thickness at that height can be, for example, 0.1023. At a sixth division starting from the base, the relative airfoil height can be, for example, 0.973731 and the maximum relative thickness at that height can be, for example, 0.1005. At a seventh division starting from the base, the relative airfoil height can be, for example, 1.0000 and the maximum relative thickness at that height can be, for example, 0.1000, Another exemplary embodiment provides a blade for a multi stage axial compressor. The exemplary blade includes an airfoil, extending from a base, with a plurality of maximum relative thicknesses at a plurality of relative heights at a plurality of divisions. At a first division starting from the base, the relative airfoil height can be, for example, 0.000000 and the maximum relative thickness at that height can be, for example, 0.1100. At a second division starting from the base, the relative airfoil height can be, for example, 0.276215 and the maximum relative thickness at that height can be, for example, 0.1027. At a third division starting from the base, the relative airfoil height can be, for example, 0.503836 and the maximum relative thickness at that height can be, for example, 0.0967. At a four division starting from the base, the relative airfoil height can be, for example, 0.690537 and the maximum relative thickness at that height can be, for example, 0.0920. At a fifth division starting from the base, the relative airfoil height can be, for example, 0.835465 and the maximum relative thickness at that height can be, for example, 0.0885. At a sixth division starting from the base, the relative airfoil height can be, for example, 0.947997 and the maximum relative thickness at that height can be, for example, 0.0860. At a seventh division starting from the base, the relative airfoil height can be, for example, 1.0000 and the maximum relative thickness at that height can be, for example, 0.0850

Referring to FIG. 1, a portion of an exemplary multi-stage compressor 1 is illustrated. Each stage 5 of the axial compressor 1 includes a plurality of circumferentially spaced blades 6 mounted on a rotor 7 and a plurality of circumferentially spaced vanes 8, downstream of the blade 6 along the longitudinal axis LA of the axial compressor 1, mounted on a stator 9. For illustration purposes only the first twenty-two stages 5 are shown in FIG. 1. Each of the different stages 5 of the axial compressor 1 has a vane 8 and a blade 6 each having a uniquely shaped airfoil 10.

Figure 2:
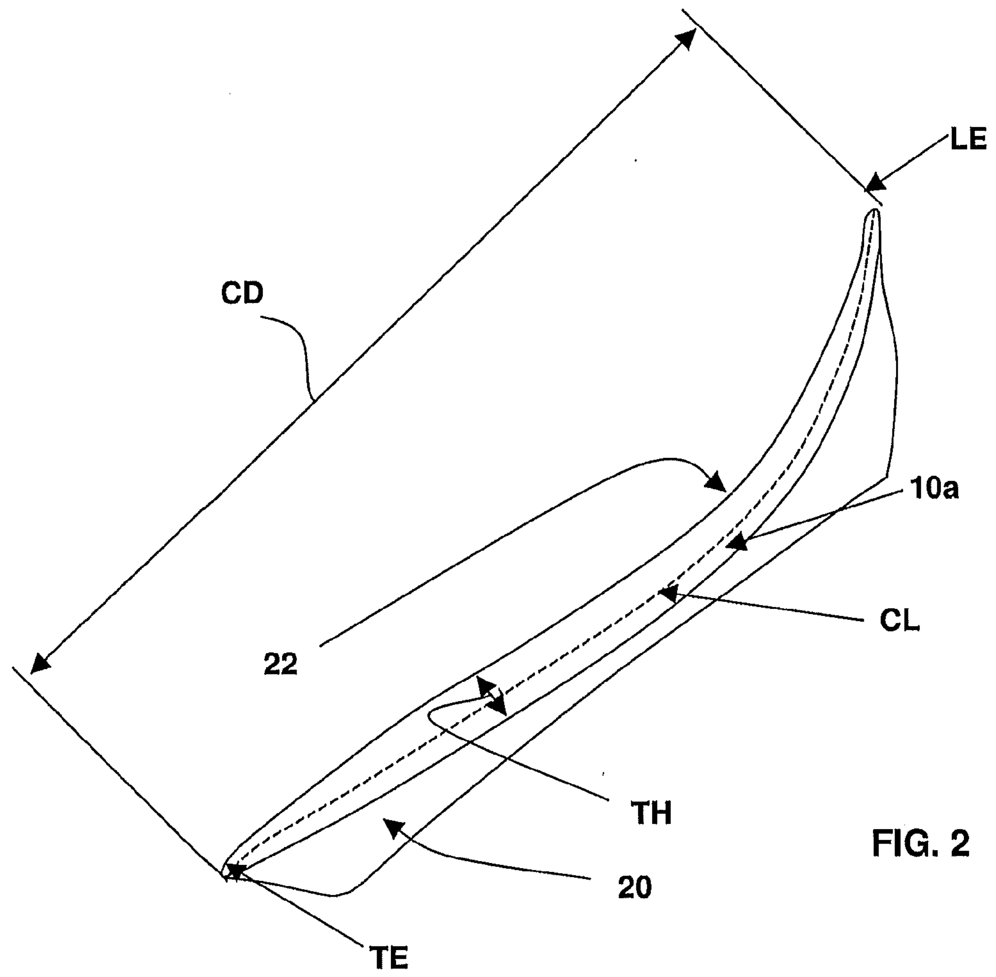
FIG. 2 Prior Art
FIG. 2 is a top view of a prior art airfoil of an exemplary stage 18-22 stage blade of FIG. 1.
Figure 3:
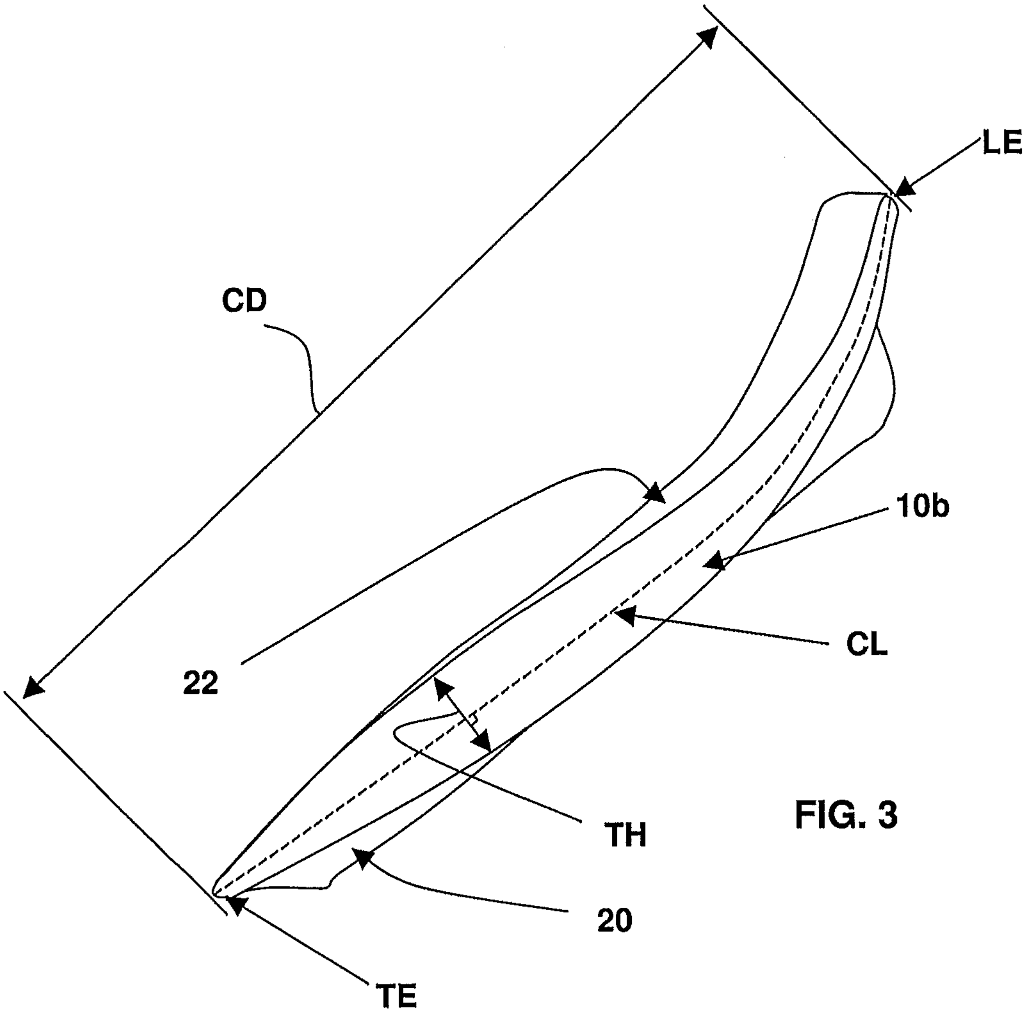
FIG. 3 is a top view of an airfoil of the exemplary blade shown in FIG. 1.

FIG. 3 is a top view of an exemplary airfoil 10*b* configured to be an airfoil 10 of a blade 6 of any one of compressor stages eighteen to twenty-two 15, shown in FIG. 1. The airfoil 10*b* has a pressure side 22, a suction side 20 and a camber line CL. The camber line CL is the mean line of the airfoil profile extending from the leading edge LE to the trailing edge TE equidistant from the pressure side 22 and the suction side 20. The airfoil 10 has a thickness TH, which is defined as the distance between the pressure side 22 and the suction side 20 of the airfoil 10 measured perpendicular to the camber line CL. The maximum thickness TH is the point across the airfoil 10 where the pressure side 22 and suction side 20 are furthest apart. The chord length CD of the airfoil 10, as shown in FIG. 2, is the perpendicular projection of the airfoil profile onto the chord line CL.

Airfoils 10 of exemplary embodiments have a maximum airfoil thickness TH profile in the radial direction RD that can be expressed in relative terms. For example, the maximum relative thickness RTH can be the maximum thickness TH divided by the chord length CD for a given airfoil height point.

Figure 4:
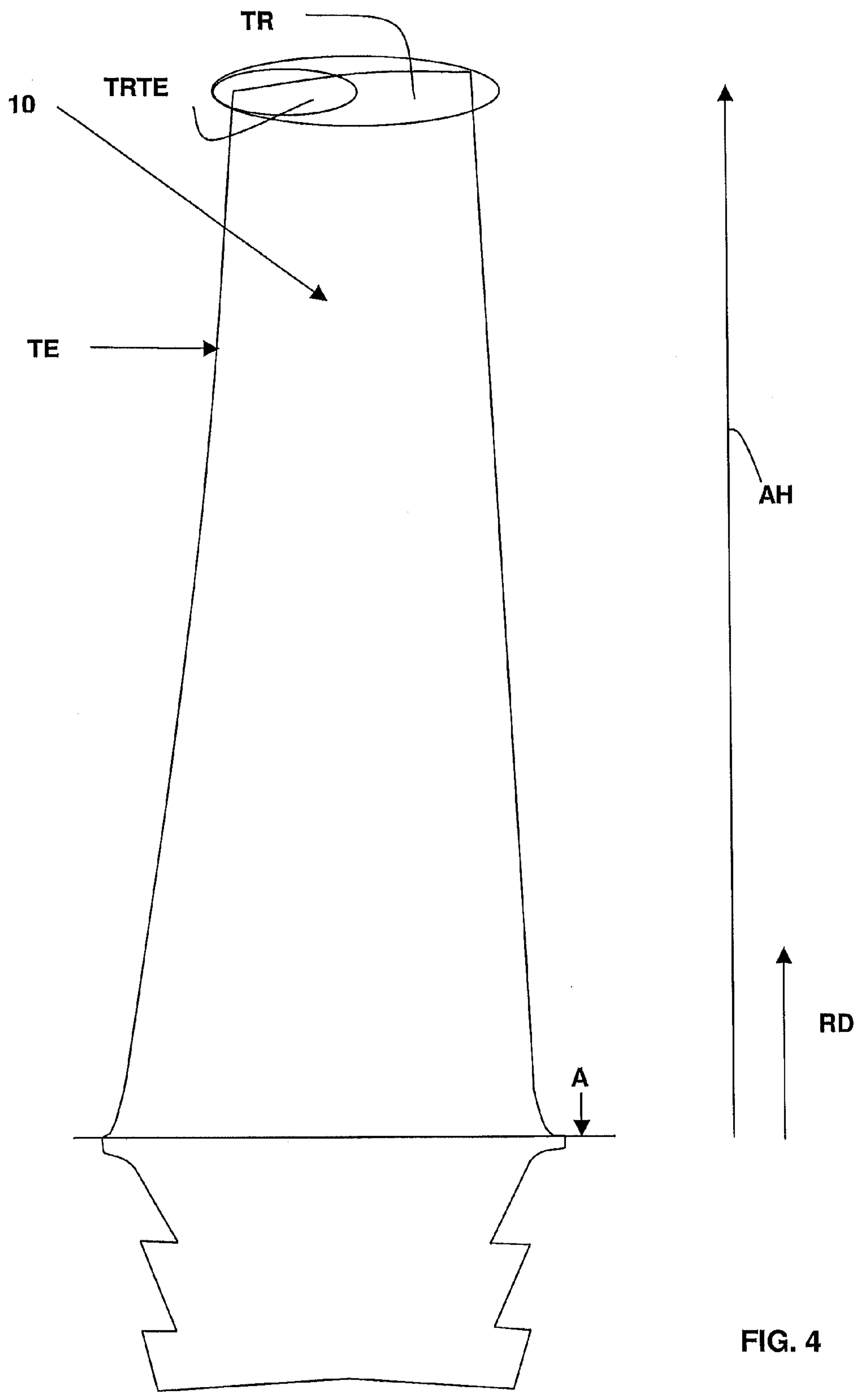
FIG. 4 is a side view of the exemplary blade shown in FIG. 1 showing airfoil features.

As shown in FIG. 4, the airfoil height point, measured in the radial direction RD, is a reference point along the airfoil height AH wherein the airfoil height AH is the distance between the airfoil base A and a radially distal end of the airfoil 10. In this disclosure airfoil height points can be referenced from the airfoil base A and expressed as relative height RAH defined as an airfoil height point divided by airfoil height AH.

FIG. 4 further shows the general location of the tip region TR of the airfoil, which is the region of the airfoil 10 furthest from its base A. This region can be further subdivided in to a corner tip region TETR, which, in this disclosure, is taken to be the corner region of the tip TR that is proximal to and includes the trailing edge TE.

Exemplary embodiments of airfoils 10 of blades 6 suitable for an axial compressor 1 will now be described, by way of example, with reference to the dimensional characteristics defined in FIG. 3, at various relative airfoil heights RAH.

An exemplary embodiment, suitable for an axial compressor eighteenth stage 5, blade 6, as shown in FIG. 1, has a maximum relative thickness RTH, taken to four decimal places, at various relative airfoil heights RAH, taken to six decimal places, as set forth in Table 1.

TABLE 1

| Maximum relative thickness RTH | Relative height RAH |
|---|---|
| 0.12 | 0 |
| 0.1139 | 0.305740 |
| 0.1089 | 0.557395 |
| 0.105 | 0.752759 |
| 0.1022 | 0.891832 |
| 0.1005 | 0.977925 |
| 0.1 | 1 |

An exemplary embodiment, suitable for an axial compressor nineteenth stage 5, blade 6, as shown in FIG. 1, has a maximum relative thickness RTH, taken to four decimal places, at various relative airfoil heights RAH, taken to six decimal places, as set forth in Table 2.

TABLE 2

| Maximum relative thickness RTH | Relative height RAH |
|---|---|
| 0.12 | 0 |
| 0.1139 | 0.304813 |
| 0.1089 | 0.556150 |
| 0.105 | 0.749733 |
| 0.1022 | 0.886631 |
| 0.1005 | 0.973262 |
| 0.1 | 1 |

An exemplary embodiment, suitable for an axial compressor twentieth stage 5, blade 6, as shown in FIG. 1, has a maximum relative thickness RTH, taken to four decimal places, at various relative airfoil heights RAH, taken to six decimal places as set forth in Table 3.

TABLE 3

| Maximum relative thickness RTH | Relative height RAH |
|---|---|
| 0.12 | 0 |
| 0.1138 | 0.304622 |
| 0.1088 | 0.549370 |
| 0.105 | 0.738445 |
| 0.1023 | 0.877101 |
| 0.1005 | 0.969538 |
| 0.1 | 1 |

An exemplary embodiment, suitable for an axial compressor twenty first stage 5, blade 6, as shown in FIG. 1, has a maximum relative thickness RTH, taken to four decimal places, at various relative airfoil heights RAH, taken to six decimal places, as set forth in Table 4.

TABLE 4

| Maximum relative thickness RTH | Relative height RAH |
|---|---|
| 0.12 | 0 |
| 0.1138 | 0.310969 |
| 0.1088 | 0.560170 |
| 0.105 | 0.750799 |
| 0.1023 | 0.888179 |
| 0.1005 | 0.976571 |
| 0.1 | 1 |

An exemplary embodiment, suitable for any one of stages eighteen to twenty one of an axial compressor as shown in FIG. 1, has a maximum thickness with a tolerance of +/−0.3%, at various relative airfoil heights RAH, taken to six decimal places, as set forth in Table 5.

TABLE 5

| Maximum relative thickness RTH | Relative height RAH |
|---|---|
| 0.12 | 0 |
| 0.1139 | 0.305181 |
| 0.1089 | 0.553382 |
| 0.105 | 0.745602 |
| 0.1023 | 0.884467 |
| 0.1005 | 0.973731 |
| 0.1 | 1 |

An exemplary embodiment, suitable for an axial compressor twenty second stage 5, blade 6, as shown in FIG. 1, has a maximum relative thickness RTH, taken to four decimal places, with a tolerance of +/−0.3%, at various relative airfoil heights RAH, taken to six decimal places, as set forth in Table 6.

TABLE 6

| Maximum relative thickness RTH | Relative height RAH |
|---|---|
| 0.11 | 0 |
| 0.1027 | 0.276215 |
| 0.0967 | 0.503836 |
| 0.092 | 0.690537 |
| 0.0885 | 0.835465 |
| 0.086 | 0.947997 |
| 0.085 | 1 |

An exemplary design method for modifying an axial compressor airfoil 10 susceptible, in use, to tip corner cracking in the tip corner region TRTE, shall now be described. An example of such an airfoil 10*a*, referred to as a pre-modified airfoil 10*a*, is shown in FIG. 2. First a baseline measurement of the pre-modified airfoil 10*a* is established. This involves, for example, checking the stress level of an airfoil 10*a*, by simulation, using force response analysis, in response to an impulse force. The check can be done by the known method of finite element analysis, wherein the impulse can be a so called perfect impulse defined by being a broad spectrum frequency impulse so as to simulate a multi-frequency impulse imparted to an airfoil typically by the action of rubbing.

The check can further include, or be the measurement of, the frequency of the chord wise bending mode, using known techniques, of the pre-modified airfoil 10*a* for later comparison with a modified airfoil 10*b* so as to address failures resulting from chord wise bending mode excitation. The determination of the final modification, ready for blade manufacture, is, in an exemplary embodiment, determined by simulation.

After establishing, by simulation, a baseline, a simulated modification of the airfoil 10, in an exemplary embodiment, involves thickening of the pre-modified airfoil 10*a* in order to shift the natural frequency of the airfoil 10 to a higher frequency so as to reduce stress in response to a broad frequency pulse in the modified airfoil 10*b*. The thickening also can increase stiffness. In an exemplary embodiment, the tip region TR can be preferentially thickened so as to minimise changes to the aerodynamic behaviour of the airfoil 10. In a further exemplary embodiment the thickening can be greatest in a region proximal and adjacent to the trailing edge TE so as to provide increased resilience of the modified airfoil 10*b* to tip corner cracking.

Next the impulse force response and the resulting stress level changed by the simulated thickening of the airfoil 10 is checked by simulation. In order to get a good comparison, the impulse force can be the same perfect impulse used to check the pre-modified airfoil 10*a*, and the same force response analysis method can be used.

To ensure resilience to tip corner cracking the changes in performance of the airfoil 10 must be significant. Therefore, if the stress level in the thickened blade 6 is greater than 50% of the pre-modified airfoil 10*a*, and/or in a further exemplary embodiment, the difference in the ratio of the frequency of the chord wise bending mode of the pre-modified 10*a* and modified airfoil 10*b* is less than 1.4:1, then the simulated thickening step can be repeated, otherwise the design steps are considered complete and the blade, with the modified airfoil 10*b*, can be ready for manufacture.

Although the disclosure has been herein shown and described in what is conceived to be the most practical exemplary embodiment, it will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather that the foregoing description and all changes that come within the meaning and range and equivalences thereof are intended to be embraced therein.

| Reference Numbers | |
|---|---|
| 1 | Axial compressor |
| 5 | Stage |
| 6 | Blade |
| 7 | Rotor |
| 8 | Vane |
| 9 | Stator |
| 10 | Airfoil |
| 10a | Pre-modified airfoil |
| 10b | Modified airfoil |
| 15 | Stages 18 to 22 |
| 20 | Suction face |
| 22 | Pressure face |
| A | Airfoil base |
| AH | Airfoil height |
| CD | Chord length |
| CL | Camber line |
| LA | Longitudinal axis |
| LE | Leading edge |
| RAH | Relative airfoil height |
| RD | Radial direction |
| RTH | Relative airfoil thickness |
| TH | Airfoil thickness |
| TE | Trailing edge |
| TR | Tip Region |
| TRTE | Corner tip region |

What is claimed is:

1. A blade for a multi-stage axial compressor, for use in any one of stages eighteen to twenty one of the axial compressor, comprising:

a base; and an airfoil, extending radially from the base, having:

a suction face and a pressure face;

a second end radially distal from the base;

a chord length;

a camber line;

a thickness defined by a distance, perpendicular to the camber line, between the suction face and the pressure face;

a plurality of relative thicknesses, defined as the thickness divided by the chord length;

an airfoil height, defined as a distance between the base and the second end; and a relative height, defined as a height point, extending in the radial direction from the base, divided by the airfoil height, wherein:

at a first division starting from the base, the relative airfoil height is 0.000000 and a maximum relative thickness at that height is 0.1200;

at a second division starting from the base, the relative airfoil height is 0.305181 and a maximum relative thickness at that height is 0.1139;

at a third division starting from the base, the relative airfoil height is 0.553382 and a maximum relative thickness at that height is 0.1089;

at a fourth division starting from the base, the relative airfoil height is 0.745602 and a maximum relative thickness at that height is 0.1050;

at a fifth division starting from the base, the relative airfoil height is 0.884467 and a maximum relative thickness at that height is 0.1023;

at a sixth division starting from the base, the relative airfoil height is 0.973731 and a maximum relative thickness at that height is 0.1005; and at a seventh division starting from the base, the relative airfoil height is 1.0000 and a maximum relative thickness at that height is 0.1000, wherein each maximum relative thickness has a tolerance of +/−0.3%, and is carried to four decimal places and wherein each relative height is carried to six decimal places.

2. A stage twenty-two blade for a multi-stage axial compressor comprising:

a base; and an airfoil, extending radially from the base, having a suction face and a pressure face;

a second end radially distal from the base;

a chord length;

a thickness defined by a distance between the suction face and the pressure face;

a plurality of relative thicknesses defined as the thickness divided by the chord length;

an airfoil height defined as a distance between the base and second end; and a relative height defined as a height point, extending in the radial direction from the base, divided by the airfoil height, wherein:

at a first division starting from the base, the relative airfoil height is 0.000000 and a maximum relative thickness at that height is 0.1100;

at a second division starting from the base, the relative airfoil height is 0.276215 and a maximum relative thickness at that height is 0.1027;

at a third division starting from the base, the relative airfoil height is 0.503836 and a maximum relative thickness at that height is 0.0967;

at a four division starting from the base, the relative airfoil height is 0.690537 and a maximum relative thickness at that height is 0.0920;

at a fifth division starting from the base, the relative airfoil height is 0.835465 and a maximum relative thickness at that height is 0.0885;

at a sixth division starting from the base, the relative airfoil height is 0.947997 and a maximum relative thickness at that height is 0.0860; and at a seventh division starting from the base, the relative airfoil height is 1.0000 and a maximum relative thickness at that height is 0.0850, wherein each maximum relative thickness has a tolerance of +/−0.3%, and is carried to four decimal places and wherein each relative height is carried to six decimal places.

3. A method for manufacturing a modified airfoil of a blade for a multistage axial compressor based on a pre-modified airfoil of a blade wherein the blade includes a base and an airfoil that has a pressure face, a suction face, and a thickness defined as a distance between the pressure face and the suction face, the method comprising:

a) checking, by simulation, a stress level of the pre-modified airfoil of a blade in response to a perfect impulse using force response analysis;

b) thickening, by simulation, of the airfoil in a way that shifts a natural frequency of the pre-modified airfoil to a higher frequency and reduces a stress in the pre-modified airfoil in response to a multi frequency impulse;

c) checking, by simulation, a stress level of the modified airfoil in response to a perfect impulse by force response analysis, and when the stress level is less than 50% of the stress level of a) repeat from b); and d) manufacturing a blade with the modified airfoil of b).

4. The method of claim 3, comprising:

in a), measurement of the frequency of a chord wise bending mode; and, in c), measurement of the frequency of chord wise bending mode of the thickened airfoil of b) and the condition to repeat b) when a difference in a ratio of the frequency of the chord wise bending mode of the pre-modified airfoil, measured in step a), and modified airfoil, measured in step c), is less than 1.4:1.

5. The method of claim 3, wherein the airfoil has a tip region, radially distal from the base and b) includes thickening the tip region of the airfoil.

6. The method of claim 5, wherein the airfoil has a trailing edge partially encompassed in the tip region, and b) includes thickening in the tip region towards the trailing edge.

7. The method of claim 4, wherein the airfoil has a tip region, radially distal from the base and b) includes thickening the tip region of the airfoil.

* * * * *